United States Patent Office 2,755,733
Patented July 24, 1956

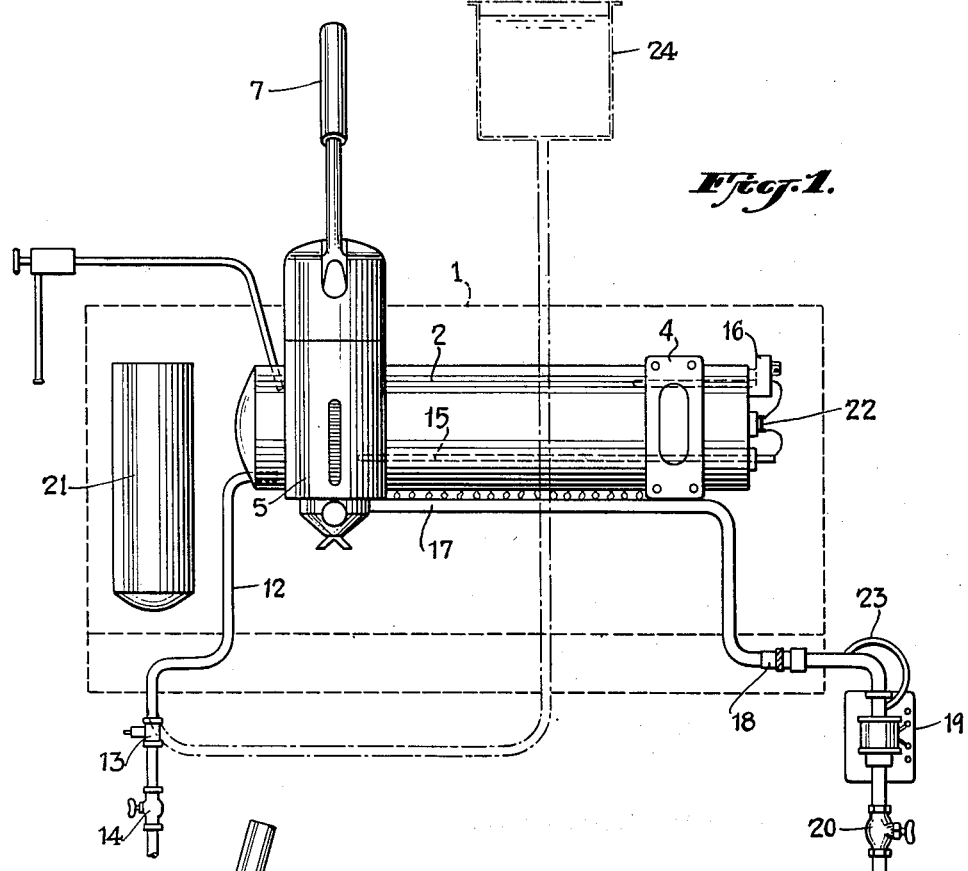
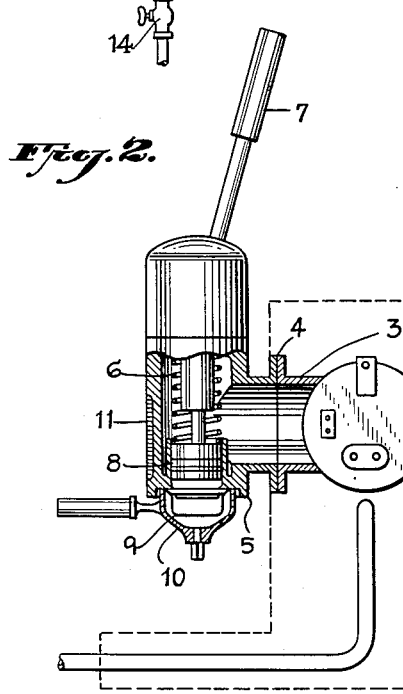
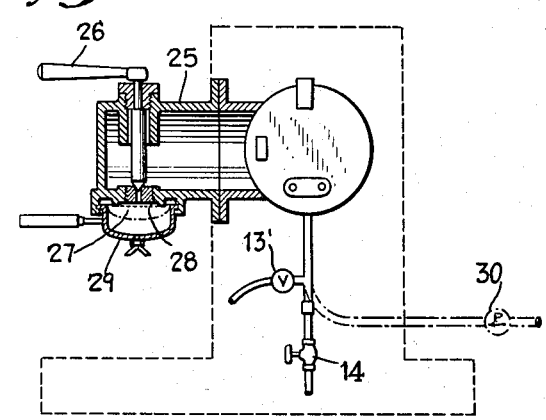
Fig. 1.
Fig. 2.
Fig. 3.
INVENTORS.
FELICE AROSIO.
ERNESTO VALENTE.
BY
ATTORNEY.

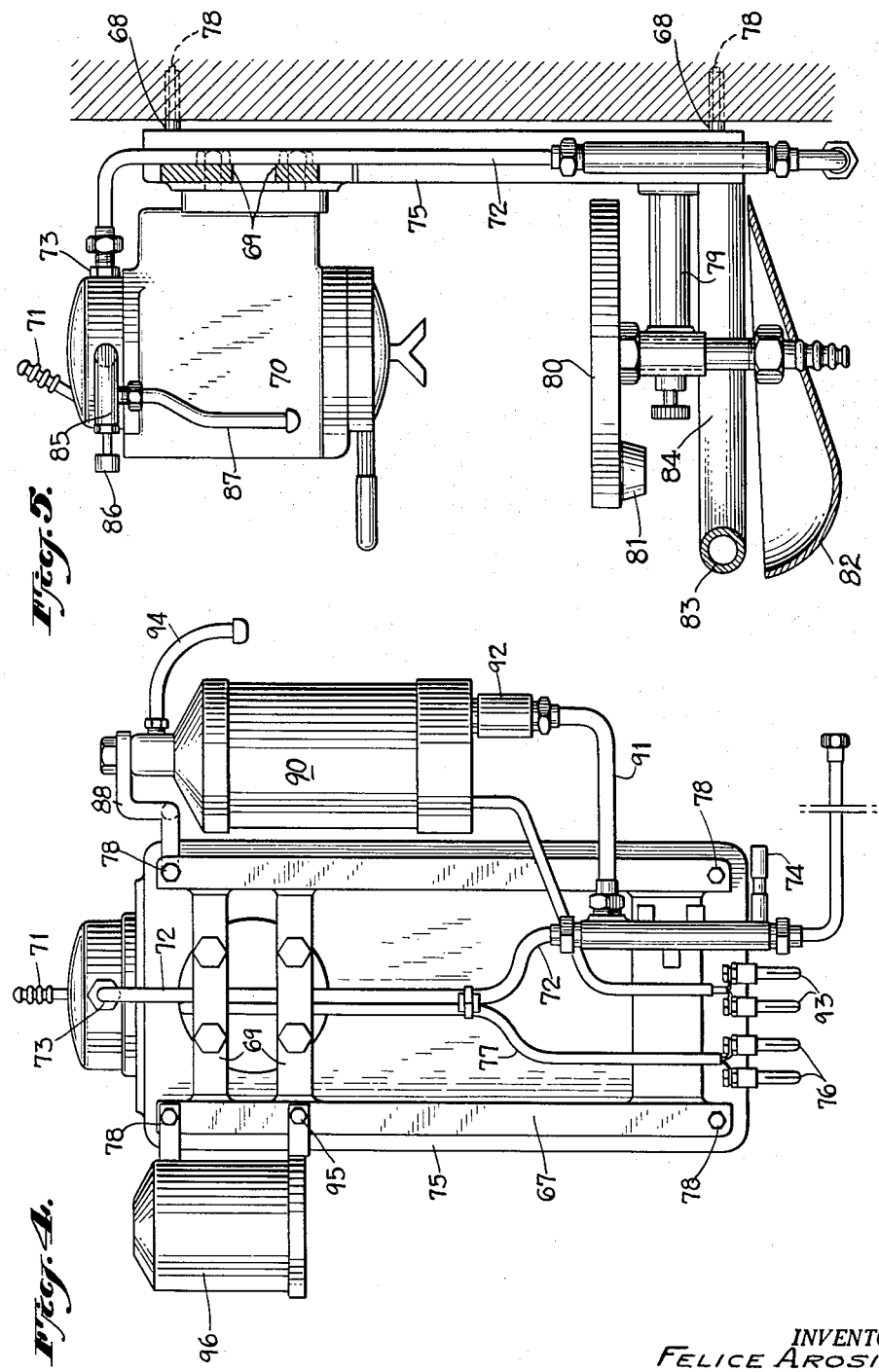

2,755,733

COFFEE MAKING MACHINE

Felice Arosio and Ernesto Valente, Milan, Italy

Application March 11, 1953, Serial No. 341,758

Claims priority, application Italy March 14, 1952

1 Claim. (Cl. 99—290)

In modern coffee-making machines, in addition to at least one coffee-making group, there are means for producing steam and hot water not only for the preparation of coffee but also for other uses.

For the provision of water, as such, steam boilers have been provided, even of low pressure (about 2 atmospheres abs.) and in these are a water chamber and a steam chamber, the former of sufficient capacity to act as a reservoir for the maximum amount of coffee required. For such a boiler, as a generator of steam, safety and water level valves are required. Such valves call for diligent attention by the bar tender, so that periodically new water is poured in, to avoid that a belated and excessive inflow of cold water causes an undesired temperature and pressure drop endangering the container and those near it. Automatic inlet devices have been suggested, but these are usually expensive and not always reliable.

The drawbacks described above are eliminated in the machine in accordance with the invention, which possesses also other advantages which will be described later. The new machine is characterized by the following:

A container in communication with a water conduit and also with at least one filter containing ground coffee, communication being achieved by means of an intercepting device, the water conduit operating at a pressure higher than that of saturated steam of 105° C.; suitable devices for heating to and maintaining the water in the said container at a temperature below but approximating 105° C., also devices for raising the water pressure in said filter to that required for coffee making; finally, a device for producing steam required for uses other than coffee making.

In the attached drawing are illustrated, merely by way of example, some embodiments of the invention.

In the drawing:

Fig. 1 is a front elevation, as seen by the bar tender, of a two-group machine;

Fig. 2 is a part sectional side view of the machine shown in Fig. 1;

Fig. 3 is a part sectional side view of a modified machine;

Fig. 4 is a front elevation of a machine according to the invention fixed on a wall panel;

Fig. 5 is a side elevation of the machine shown in Fig. 4.

The same numerals designate the same parts in all figures.

With reference to Figs. 1 to 3 numeral 1 designates a frame which carries the machine, 2 indicates a cylindrical water container held horizontally by the said frame. The container has two wide lateral connections, 3 and 3', provided with flanges 4 and 4', respectively. A body 5 of a coffee making group is connected to the flange 4. In the drawing, the second group is not shown attached to the flange 4.

The coffee making group is provided with a spring 6 which is tensioned by hand by lifting a lever 7 which operates a piston moving in the body 5. The downward plunge is brought about by the expansion of the spring, and serves to eject the hot water collected over a filter 9 filled with ground coffee, the filter being attached to the body by a retainer 10. A thermometer 11 is applied to the cylindrical wall of the body 5. A water supply conduit 12 provided with an outlet valve 13 and a tap 14 terminates in the container 2.

In the bottom of the container 2 an electric heating resistance 15 controlled by a thermostat 16 is inserted. A gas burner 17 is located below the container 2 and has a gas inlet tube on which are mounted in succession a regulating device 18, an electrically actuated valve 19 and an intercepting tap 20. Numeral 21 indicates a steam producing unit, for the production of steam required for purposes other than coffee making. 22 indicates a fuse inserted in the electric network which will be described later.

The machine operates as follows:

Water is supplied through tube 12 to container 2, which, during the working period of the coffee making machine, is kept automatically full at the same pressure as that of the water duct. The electric resistances, supplied by the electric line current heat the water to the temperature of 105° C. When this temperature is reached, the thermostat interrupts the current which is switched on again when the temperature drops below 105° C. As an alternative, the gas burner 17 can be used instead of the electric current. The electrically operated valve 19 is also controlled by the thermostat 16, which closes valve 19 when the temperature of the water goes above 105° C., and opens it again when the temperature falls. Even when valve 19 is closed, there continues to be a small gas leakage through a conduit 23 which by-passes the valve itself, so that the gas burners are never completely turned off and the temperature of the water in container 2 is maintained by the regulation of the intensity of the gas flame by increasing and diminishing the gas supply.

It is clear that where the machine is equipped both with electric resistances and gas burners, as in the example described, not only can either system be used separately, but also that both systems can be used simultaneously if required, for example for the initial heating of the machine.

In the apparatus described, it is sufficient that the pressure in the container be equal to or greater than .2 relative atmospheres for preventing production of steam at 105° C.

Such a pressure is usually available, and should it not be available, it can readily be obtained by the installation of a feeding tank 24 installed, for example, at a height of three metres as indicated by dotted lines in Fig. 1.

The higher pressure required to make coffee is obtained by means of the spring 6 and the piston 8.

Fig. 3 illustrates a modified apparatus. It differs from the one shown in Fig. 2 in that a conduit 25 forms a chamber in communication with the interior of the container 2, the chamber being closed at the bottom by a valve 28 operated by a lever 26 which valve connects the chamber with a filter chamber 27 which is filled with coffee onto which the water is sprayed from the valve 28.

The filter is enclosed in a filter retainer 29 applied in the usual manner.

To the water supply tube an outlet valve 13' and a tap 14 are connected. In this case the pressure required for coffee making must be in the container, and therefore it must either be available in the water system, or a pump 30 must be provided.

If the tap 14 is open, the valve 13' might be closed, but if, by some mischance the tap should not be open, any excess of pressure in the container must find an outlet through the valve 13'.

A particularly interesting embodiment of the invention is shown in Figs. 4 and 5. Numeral 67 designates a metal frame of rectangular shape, adapted to be fixed on a wall with suitable spacers 68 so as to leave a clearance between the frame and the wall. The frame has two upper cross pieces 69 to which is fixed a coffee making unit 70 comprising a piston actuated by a lever 71, electric resistances designed to heat water up to the temperature required for coffee making, and a water supply pipe 72 which is placed between the wall and the frame and terminating in the unit at 73. The other end of the pipe 72 is connected with the water supply system or a tank or a drinking water pump.

Provision of a safety valve 74 on the pipe 72 is advised. The frame 67 and all that is between the frame and the wall are covered by a metal case 75.

On the lower part of the said case is fixed a plug 76 which connects the electric supply cable to the resistances of the unit. The frame is fixed on the wall by the means of four bolts 78. The frame has an extension 79 which supports a cup tray 80 which is adjustable to suit the dimensions of the cups. An extension 81 may be provided on the tray 80 to be used for pressing the ground coffee into the removable filter chamber when the latter is filled with ground coffee. Under the tray 80 a cross bar 83 is provided against which the removed filter may be knocked for emptying the used coffee grounds into a pan 82 fixed below the bar 83 to the frame on the panel, the cross bar 83 being connected with the panel or case 75 by brackets 84.

The water chamber of the coffee making unit 70 is provided with an outlet tube 87 controlled by a valve 85 having a handle 86.

To the upper right bolt 78 (Fig. 4), fixing the panel to the wall, a bracket 88 is connected which supports the steam producing unit 90. Water is supplied to the unit 90 through a tube 91 connected with the main tube 72 through a fine adjustment valve 92.

The steam producing unit contains an electric resistance of the armoured type, which is fed by a cable terminating in a plug 93. Numeral 94 designates a pipe conducting the steam produced in the unit 90 to a place of use.

To the upper left bolt 78 (Fig. 4), and a bolt 95 is fixed a measuring device for ground coffee, with or without grinder, or simply a glass container 96. The apparatus shown in Figs. 4 and 5 is suitable for domestic use and for small bars, because of its simplicity and low cost, easy operation and maintenance.

The apparatus including a steam generator, coffee grinder, and measuring device is suitable for making coffee, tea, punch, etc. Its small overall dimensions, the absence of a boiler and safety valve, render it particularly suitable for setting up in restaurants, automobiles, motor coaches, and cars.

Having thus described our invention, our claim is as follows:

A coffee making machine comprising, in combination, a water heater, a container connected with said heater for receiving hot water therefrom, said container including a cylinder, a receptacle disposed below said cylinder for receiving ground coffee, a piston movable in said cylinder, means extending outside of said container for reciprocating said piston for pressing hot water through the ground coffee, an outlet in said receptacle for discharging the brewed coffee, a vertical wall panel supporting said water heater and said container including said receptacle, a cup tray disposed below said outlet, a support means for said cup tray connected with said panel and including means for adjusting the elevation of said cup tray, a cross bar mounted on said panel below said cup tray against which cross bar said receptacle can be knocked for emptying out the used coffee grounds, and a pan supported by said panel below said cross bar for receiving the knocked out coffee grounds.

References Cited in the file of this patent

UNITED STATES PATENTS

| Number | Name | Date |
|---|---|---|
| Re. 22,879 | Peters et al. | May 13, 1947 |
| 1,646,746 | Carroll | Oct. 27, 1927 |
| 1,804,795 | Lee | May 12, 1931 |
| 1,990,546 | Hubbard | Feb. 12, 1935 |
| 2,008,065 | Douglas | July 16, 1935 |
| 2,012,645 | Thomas | Aug. 27, 1935 |
| 2,016,281 | Harper et al. | Oct. 8, 1935 |
| 2,154,845 | Hegwein | Apr. 18, 1939 |
| 2,248,595 | Weeks | July 8, 1941 |
| 2,385,132 | Graham | Sept. 18, 1945 |
| 2,387,871 | Bowmann | Oct. 30, 1945 |

FOREIGN PATENTS

| Number | Country | Date |
|---|---|---|
| 293,551 | Great Britain | July 12, 1928 |
| 375,023 | Italy | Sept. 20, 1939 |
| 589,323 | Germany | Dec. 6, 1933 |
| 892,166 | France | Jan. 3, 1944 |
| 899,997 | France | Sept. 11, 1944 |
| 986,124 | Italy | July 27, 1951 |